Jan. 23, 1940.　　　A. M. HILL ET AL　　　2,187,878
COLLAR WELDING JIG
Filed Feb. 27, 1937

Inventors:—
Arthur Miller Hill
Jennings Bryan Harshman
BY Lyle S. Motley
ATTORNEY Patented Jan. 23, 1940

2,187,878

UNITED STATES PATENT OFFICE 2,187,878

COLLAR WELDING JIG

Arthur Miller Hill and Jennings Bryan Harshman, Tulsa, Okla., assignors to Stanolind Pipe Line Company, Tulsa, Okla., a corporation of Maine Application February 27, 1937, Serial No. 128,175

4 Claims. (Cl. 113—102)

This invention relates to a device for holding a plurality of members upon which certain work operations are to be performed and for adjusting the position of said members relative to each other. More particularly, the invention relates to a collar welding jig.

Pipe lines, particularly those for transmitting oil, are often composed of what is conventionally referred to as screw pipe sections joined by collars into which the adjoining ends of pipe are screwed. These connections often spring leaks due to various causes such as imperfect threads, galling of the metal when the joint is made up too fast without proper lubrication, cross threading and strains caused by expansion and contraction. In order to stop these leaks it is often desirable to weld the collars to the pipe sections as by electric or acetylene welding. The strains to which these joints are subjected in the accomplishment of the welding operation often result in the threads pulling out. It is readily apparent that this might lead to disastrous results particularly when the pipe contains inflammable material. It is thus necessary to provide for holding the sections of pipe together throughout the welding operation.

It is an object of the present invention to provide an improved device for gripping two portions of a pair of linearly disposed members for holding and/or pulling the same together for the purpose of performing a work operation thereon, such for example as welding or otherwise fastening the ends of said members together.

It is an object of the present invention to provide an improved device for clamping the opposed ends of a pair of pipes for holding and/or pulling them together for the purpose, for example, of welding the connecting collar to the pipes.

It is a further object of the present invention to provide an improved collar welding jig which is capable of quick and convenient installation in position about the adjacent portions of linearly disposed sections of pipe.

It is a still further object of the present invention to provide an arrangement of means for supporting and normally urging the gripping jaws of a collar welding jig into inoperative position and for simultaneously and accurately moving the gripping dogs into aligned gripping relationship with the work being operated on.

It is a still further object of the present invention to provide in a collar welding jig an improved encompassing collar for supporting the gripping dogs.

A preferred embodiment of my device is illustrated in the accompanying drawing in which.

Figure 1:
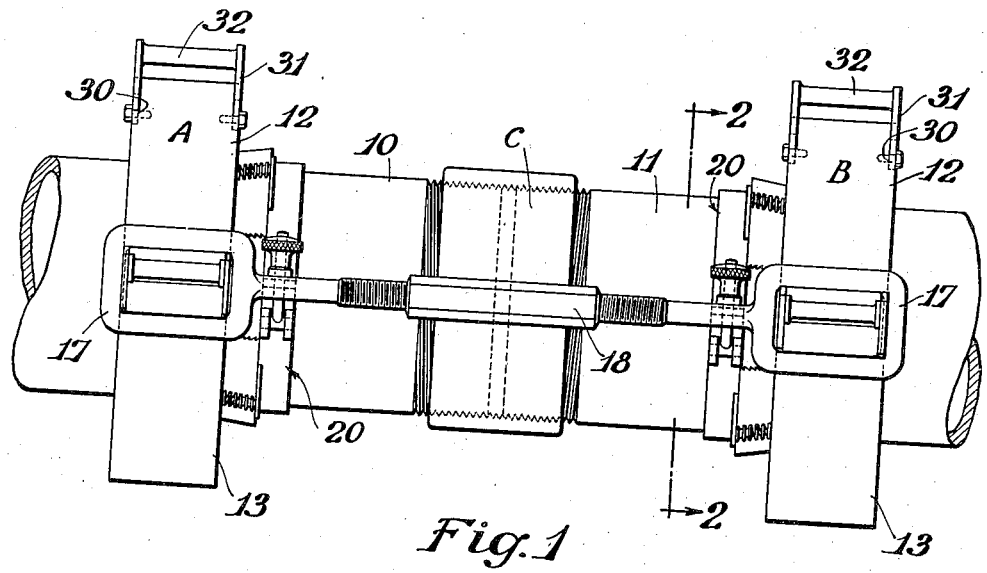
Figure 1 is an assembly view of my device in position on opposed sections of pipe.

Referring to Figure 1, I have shown a pair of encompassing rings or collars A and B surrounding opposed ends of two linearly disposed pipe sections 10 and 11. The pipe sections 10 and 11 are joined by an interiorally threaded collar or coupling C which receives the threaded ends of pipes 10 and 11. The rings or collars A and B are divided into two readily separable arcuate portions 12 and 13 (see Figure 2). These separate arcuate portions 12, 13, are arranged for ready assembly about the respective ends of the pipes 10, 11, and are formed on their inner peripheries with inclined supporting surfaces 14 for slidably receiving wedge-shaped gripping dogs 15. The adjoining ends of the respective arcuate portions are formed with outwardly extending protuberances 16 thereon. These protuberances on the respective arcuate portions lie in juxtaposed complementary position to one another for confined reception within eye members 17. Turn buckles 18 are provided for pulling or drawing the eye members together. The eye members 17 serve both as means to fasten together the arcuate members to form the rings A and B and as part of the means for drawing the rings A and B together to adjust the pipe ends 10 and 11 relative to each other. It is apparent that encompassing means in forms other than rings may be provided, such for example as octagonal shaped collars.

Auxiliary rings 20 are provided and are shown clamped about the respective ends of the pipes in advance of the path of movement of the gripping jaws, for effecting simultaneous gripping of the jaws against the pipe (as will be seen). These auxiliary rings 20 may be formed in any desired manner, but I have shown them for purposes of illustration as comprising two arcuate portions 21 and 22 made of strap metal hinged together on one side and provided with fastening means on the other side. The fastening means is of a conventional form comprising a hinged bolt 23 welded to the end of one of said arcuate portions 21 and a nut 24 received on the free end of said bolt and cooperating with the opposed end of the other arcuate member 22.

Figures 2, 3, 4:
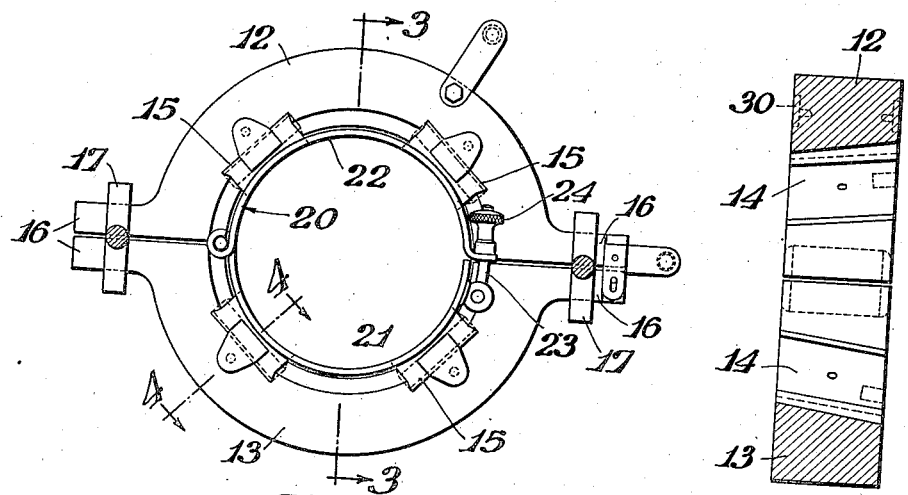
Figure 2 is an end elevation taken on line 2—2 of Figure 1 with the pipe removed.
Figure 3 is a cross section of the ring taken on line 3—3 of Figure 2 with accessories removed.
Figure 4 is a detailed cross section view taken on line 4—4 of Figure 2 and shows the relationship of the gripping dog and ring.
Figure 5:
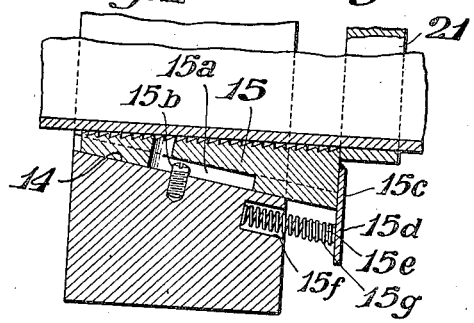
Figure 5 is an end elevation view of the gripping dog.

Figures 3 and 4 show in detail the arrangement of the inclined surfaces 14 on the inside of the ring or collar for slidably receiving the wedge shaped dogs 15. I have shown ratchet shaped teeth on the dog but it is apparent that any well known form of teeth may be employed. The gripping dog is formed with a longitudinal slot 15a in the face adjacent the ring supporting surface, for cooperation with a stub bolt 15b for guiding and limiting its movement. The stub bolt is screwed into a threaded opening within the jaw 15 supporting face of the ring and positioned for cooperation with the above referred to guide in the jaw 15. A plate member 15c is welded to the forward edge of the gripping jaw 15. This plate is provided with an opening 15d formed therein for the reception of a stub shaft 15e. An opening 15f has been formed in the forward face of each of the rings A and B juxtaposed to the opening in the plate, for the reception of one end of a compression spring 15g, the opposite end of which is received about the stub shaft 15e. I have shown four identical gripping dogs 15, two carried on each of the opposed arcuate ring members 12 and 13, but it is apparent that any desired number of such gripping dogs may be employed. From the above description, it will be seen that the gripping dog is normally biased to a non-gripping position but when the rings or collars A and B are drawn toward each other, by operation of the turnbuckles 18, the forward edges of the dogs are simultaneously brought into contact with the auxiliary rings 20 thus causing simultaneous movement of the dogs 15 against the biasing effect of their respective springs 15g to bring the dogs into gripping position. This biased relationship is very important as it provides automatic means for maintaining the gripping dogs in a retracted non-interfering, non-gripping position while installing the ring or collars A and B about the pipes 10 and 11, and further makes possible an accurate simultaneous movement of all of the gripping dogs 15 into gripping relationship with the pipe sections 10 and 11 upon operation of the turnbuckles.

I have shown a handle arrangement for the rings comprising openings 30 in the side of the arcuate member 12 which are adapted to receive side members 31, which in turn are joined at their outer ends by a handle 32. I have indicated only two of these handles on arcuate member 12 but as many handles may be employed on both members 12 and 13 as desired. This arrangement of handles greatly facilitates the positioning of the segmental portions 12 and 13 of the ring into place about the pipe.

I have shown and described my invention as applied to two pipe sections but I contemplate its use with other forms of linearly disposed members. It is apparent for example that with only slight modification it could be used in connection with linearly disposed railway rails and the like.

*Operation*

The segmental rings A and B, together with the gripping jaws 15 carried thereby, are first placed in position about the pipe sections 10 and 11. The eye members 17 are then placed in position about the juxtaposed protuberances 16 on the arcuate members 12 and 13. The auxiliary rings 20 are placed in position about the pipe sections and adjacent the forward faces of the gripping dogs 15, and clamped in position. The turnbuckles 18 (one on each side) are then adjusted to draw the rings A and B toward one another. The auxiliary rings 20 function to prevent movement of the gripping dogs relative to the corresponding pipes, thus causing movement of the gripping dogs 15, relative to their supporting faces 14, into simultaneous aligned gripping relationship with the pipes 10 and 11, as the rings or collars A and B are moved towards each other, after which the two ends of the pipes may be held and/or drawn together for performing the desired operation thereon such for example as welding.

While I have disclosed my invention in connection with a specific embodiment thereof, it is to be understood that this is by way of illustration rather than by way of limitation, and I do not mean to be limited thereby except as indicated in the scope of the appended claims, which should be construed as broadly as the prior art will permit.

We claim:

1. A device for holding and/or pulling together adjacent portions of two linearly disposed members comprising an encompassing collar for receiving each of said portions, said encompassing collars each being divided into a plurality of separate portions to facilitate ready installation and being further provided with wedge-shaped gripping jaws carried on the inner surfaces thereof, and means for pulling the two encompassing collars toward each other and causing the gripping jaws carried thereby to hold and/or pull the said portions of said linearly disposed members together, said last-named means being further characterized by the fact that it also functions to hold the separable portions of the collars together.

2. In a collar welding jig for clamping and drawing together two linearly disposed pipe sections, comprising two ring members arranged to embrace each of said pipe sections, each ring member being divided into a plurality of separable arcuate portions, said arcuate portions having adjacent and corresponding protuberances on their outer peripheries, and being provided on their inner peripheries with wedge-shaped gripping jaws, and means for drawing the two rings toward each other, said means comprising means for engaging pairs of said corresponding protuberances whereby to fasten said arcuate portions together.

3. A collar welding jig for clamping and drawing together two linearly disposed pipe sections, comprising two ring members each arranged to embrace one of said pipe sections, each ring member being divided into a plurality of separable arcuate portions, said arcuate portions having adjacent and corresponding projections on their outer peripheries and being further provided with tapered jaw-receiving surfaces on their inner walls, pipe-gripping means comprising wedge-shaped gripping jaws mounted on said jaw-receiving surfaces, resilient means for urging said jaws into retracted disengaged position, means for guiding and limiting the relative movement between said jaws and said supporting surfaces, means for connecting said ring members for movement relative to each other comprising eye bolts and turnbuckles, each of said eye bolts receiving adjoining pairs of said projections on said arcuate portions of said rings whereby to hold said arcuate portions together, said turnbuckles connecting said eye bolts for drawing said ring members toward each other, and means for causing simultaneous movement of said gripping jaws into gripping position in opposition to the action of said resilient means as said turnbuckles are operated, comprising auxiliary rings arranged to be clamped about said pipe sections in advance of the path of movement of said jaws, whereby the drawing of said first-named rings toward each other will bring the wedge-shaped gripping jaws into contact with the said auxiliary rings and thus cause the said wedge-shaped gripping jaws to be forced simultaneously into gripping relation with said pipe sections.

4. In a device for gripping and drawing together adjacent portions of two linearly disposed members, work-surrounding rings adapted to receive each of said portions, said rings being formed with inclined jaw-receiving faces on their inner peripheries, wedge-shaped gripping jaws mounted on said faces, means for guiding and limiting the movement of said gripping jaws, spring means for urging said gripping jaws into disengaged position, means for drawing said work-surrounding rings toward each other, and a pair of auxiliary rings arranged to be clamped on said members in the path of movement of said work-surrounding rings toward each other to contact the forward faces of said gripping jaws and thereby cause the simultaneous movement of said jaws against the action of said spring means into gripping relation with said members upon movement of said work-surrounding rings toward each other.

ARTHUR MILLER HILL.
JENNINGS BRYAN HARSHMAN.